(12) United States Patent
Luo et al.

(10) Patent No.: US 12,038,512 B2
(45) Date of Patent: Jul. 16, 2024

(54) CONTROL METHOD, APPARATUS AND DEVICE FOR PREVENTING PSEUDO GNSS SIGNAL INTERFERENCE, AND STORAGE MEDIUM

(71) Applicant: ZTE CORPORATION, Guangdong (CN)

(72) Inventors: Li Luo, Guangdong (CN); Xiaoming Fu, Guangdong (CN); Quanshi Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 266 days.

(21) Appl. No.: 17/617,927

(22) PCT Filed: Apr. 11, 2020

(86) PCT No.: PCT/CN2020/084350
§ 371 (c)(1),
(2) Date: Dec. 9, 2021

(87) PCT Pub. No.: WO2020/248689
PCT Pub. Date: Dec. 17, 2020

(65) Prior Publication Data
US 2022/0308236 A1    Sep. 29, 2022

(30) Foreign Application Priority Data
Jun. 10, 2019 (CN) .......................... 201910498057.1

(51) Int. Cl.
*G01S 19/21* (2010.01)
*H04K 3/00* (2006.01)

(52) U.S. Cl.
CPC .............. *G01S 19/21* (2013.01); *H04K 3/224* (2013.01); *H04K 3/28* (2013.01); *H04K 3/45* (2013.01);
(Continued)

(58) Field of Classification Search
CPC .......... G01S 19/21; H04K 3/224; H04K 3/28; H04K 3/45; H04K 3/65; H04K 3/827; H04K 3/90
See application file for complete search history.

(56) References Cited

U.S. PATENT DOCUMENTS 8,830,112 B1    9/2014 Buehler et al.
9,466,881 B1 *  10/2016 Berry .................... G01C 21/20
(Continued)

FOREIGN PATENT DOCUMENTS

| CN | 106093978 A | 11/2016 |
| CN | 106908808 A | 6/2017 |

(Continued)

OTHER PUBLICATIONS

ZTE Corporation, Extended European Search Report, EP 20822530.0, Jul. 7, 2022, 7 pgs.
(Continued)

*Primary Examiner* — Hai V Nguyen
(74) *Attorney, Agent, or Firm* — Dority & Manning, P.A.

(57) ABSTRACT

A control method, a control apparatus and a device for preventing pseudo GNSS signal interference, and a storage medium are provided. The method includes: in response to detecting that a received GNSS signal includes a pseudo GNSS signal, restraining a time service system of a communication device from tracking the received GNSS signal; and removing the restraining on the time service system in response to detecting that the pseudo GNSS signal disappears.

20 Claims, 5 Drawing Sheets

S101
In response to detecting that a received GNSS signal includes a pseudo GNSS signal, restrain a time service system of a communication device from tracking the received GNSS signal S102
Remove the restraining on the time service system in response to detecting that the pseudo GNSS signal disappears

(52) U.S. Cl.
CPC .............. *H04K 3/65* (2013.01); *H04K 3/827* (2013.01); *H04K 3/90* (2013.01)

(56) References Cited

U.S. PATENT DOCUMENTS

| | | | | |
|---|---|---|---|---|
| 9,651,671 | B2* | 5/2017 | Raasakka | H04K 3/22 |
| 10,338,229 | B2* | 7/2019 | Levy | G01S 19/11 |
| 10,509,130 | B2* | 12/2019 | Snyder | G01S 19/21 |
| 10,694,379 | B2* | 6/2020 | Liu | H04W 12/06 |
| 10,727,599 | B2* | 7/2020 | Wolniansky | H01Q 13/106 |
| 10,755,542 | B2* | 8/2020 | Bogdan | G08B 13/19656 |
| 10,775,510 | B2* | 9/2020 | Agee | G01S 19/215 |
| 10,777,873 | B2* | 9/2020 | Britz | H01Q 1/1228 |
| 10,784,670 | B2* | 9/2020 | Bennett | H02G 7/205 |
| 10,852,391 | B2* | 12/2020 | Cornic | F41H 11/02 |
| 10,908,293 | B2* | 2/2021 | Whitehead | G01S 19/55 |
| 10,908,294 | B2* | 2/2021 | Lyusin | H04W 4/027 |
| 10,916,969 | B2* | 2/2021 | Britz | H01F 38/14 |
| 10,938,108 | B2* | 3/2021 | Henry | H01Q 25/007 |
| 11,022,421 | B2* | 6/2021 | Andreason | A61B 5/4836 |
| 11,032,819 | B2* | 6/2021 | Gerszberg | H04B 7/022 |
| 11,550,062 | B2* | 1/2023 | Zavrel | G01S 19/37 |
| 11,585,943 | B2* | 2/2023 | Lyusin | H04W 12/122 |
| 11,668,786 | B2* | 6/2023 | El Assaad | G01S 1/042 455/456.1 |
| 11,681,049 | B2* | 6/2023 | Hiroi | B64C 39/024 342/14 |
| 11,698,462 | B1* | 7/2023 | Archer | G01S 19/258 342/14 |
| 11,750,319 | B1* | 9/2023 | Kong | H04K 3/80 455/1 |
| 2011/0037650 | A1* | 2/2011 | Lennen | G01S 19/33 342/357.74 |
| 2015/0293234 | A1* | 10/2015 | Snyder | G01S 19/21 342/357.59 |
| 2016/0047915 | A1* | 2/2016 | Raasakka | H04K 3/90 342/357.59 |
| 2016/0223678 | A1* | 8/2016 | Kim | G01S 19/215 |
| 2016/0280401 | A1* | 9/2016 | Driscoll | G01S 5/011 |
| 2016/0282473 | A1* | 9/2016 | Driscoll | G01S 19/396 |
| 2018/0180742 | A1* | 6/2018 | Capet | G01S 19/36 |
| 2018/0196142 | A1* | 7/2018 | Levy | G01S 19/015 |
| 2018/0372879 | A1* | 12/2018 | Whitehead | G01S 19/215 |
| 2019/0129041 | A1* | 5/2019 | Lyusin | H04W 4/027 |
| 2020/0371245 | A1* | 11/2020 | Murphy | G01S 19/30 |
| 2021/0311203 | A1* | 10/2021 | Reis | G01S 19/215 |
| 2022/0057527 | A1* | 2/2022 | Agee | G01S 19/24 |
| 2022/0276389 | A1* | 9/2022 | Yu | G01S 19/29 |

FOREIGN PATENT DOCUMENTS

| | | |
|---|---|---|
| CN | 109709584 A | 5/2019 |
| EP | 2930536 A2 | 10/2015 |
| RU | 2671238 C1 | 10/2018 |
| WO | 2009158594 A1 | 12/2009 |
| WO | 2011157554 A1 | 12/2011 |
| WO | 2014189461 A1 | 11/2014 |
| WO | 2019097432 A1 | 5/2019 |

OTHER PUBLICATIONS

ZTE Corporation, International Search Report with English Translation, PCT/CN2020/084350, Jun. 30, 2020, 6 pgs.

Tongxian Zhu, et al., "Monitoring and optimization of GPS interference in TD-LTE system," Telecom Engineering Technics and Standardization, Dec. 2017, 5 pgs.

ZTE Corporation, RU First Office Action with English Translation, RU2021139210, Mar. 22, 2022, 16pgs.

Chinese Office Action (w/ English translation) for corresponding Application No. 201910498057.1, dated Jan. 30, 2024, 13 pages.

\* cited by examiner

US 12,038,512 B2

CONTROL METHOD, APPARATUS AND DEVICE FOR PREVENTING PSEUDO GNSS SIGNAL INTERFERENCE, AND STORAGE MEDIUM

CROSS REFERENCE TO RELATED APPLICATIONS

The present application is a United States National Stage Application filed under 35 U.S.C. § 371 of PCT Patent Application Serial No. PCT/CN2020/084350, filed Apr. 11, 2020, which claims priority to Chinese patent application No. 201910498057.1, filed on Jun. 10, 2019, each of which is incorporated by reference herein in its entirety.

TECHNICAL FIELD

The present disclosure relates to the technical field of communication, in particular to a control method, an apparatus and a device for preventing pseudo GNSS signal interference, and a storage medium.

BACKGROUND

The Global Navigation Satellite System (GNSS) is a space-based radio navigation and positioning system that can provide users with full-time, three-dimensional coordinates, velocity and time information at any place on the earth's surface or near-earth space. It has been widely used in time service fields such as time service fields in wireless communication, and also in other fields.

SUMMARY

Some embodiments of the present disclosure provide a control method, an apparatus and a device for preventing pseudo GNSS signal interference, and a storage medium, which solve the problem of how to prevent the pseudo GNSS signal from interfering the time service system of the communication device.

To solve the above technical problem, some embodiments of the present disclosure provide a control method for preventing pseudo GNSS signal interference, which includes: in response to detecting that a received GNSS signal includes a pseudo GNSS signal, restraining a time service system of a communication device from tracking the received GNSS signal; and removing the restraining on the time service system in response to detecting that the pseudo GNSS signal disappears.

To solve the above technical problem, some embodiments of the present disclosure provide a control apparatus for preventing pseudo GNSS signal interference, which includes a control module configured to: in response to detecting that a received GNSS signal includes a pseudo GNSS signal, restrain a time service system of a communication device from tracking received GNSS signal; and remove the restraining on the time service system in response to detecting that the pseudo GNSS signal disappears.

To solve the above technical problem, some embodiments of the present disclosure further provide a communication device, which includes a processor, a memory, and a communication bus, wherein the communication bus is configured to connect the processor and the memory; and the processor is configured to execute a computer program stored in the memory to implement operations of the control method for preventing pseudo GNSS signal interference as described above.

To solve the above technical problem, some embodiments of the present disclosure further provide a non-transitory computer-readable storage medium storing at least one computer program executable by at least one processor to implement the operations of the control method for preventing pseudo GNSS signal interference as described above.

Other features and corresponding beneficial effects of the present disclosure are set forth later in the description, and it should be understood that at least some of the beneficial effects become apparent from the description of the present disclosure.

DETAILED DESCRIPTION

To make the objects, technical solutions, and advantages of the present disclosure more clear, some embodiments of the present disclosure will be described in further detail by way of the detailed description in conjunction with the accompanying drawings. It should be understood that the specific embodiments described herein are intended to be explanatory only and are not intended to limit the present disclosure.

The inventors note that some special application scenarios need pseudo GNSS signals, such as scenarios for trapping unmanned aerial vehicles (UAV), production environments for UAV protective devices, auxiliary positioning with pseudo GNSS in a tunnel, etc. The possibility of pseudo GNSS signals in space is increasing. However, due to the large randomness of pseudo GNSS signals, not all pseudo GNSS can provide reliable timing reference signals for the time service system of a communication device. Therefore, the pseudo GNSS signal received by the time service system of a communication device (such as the time service system of a base station) may not provide a timing reference signal. In this case, if the time service system tracks the pseudo GNSS signal, it may lead to a failure of giving time normally, thereby causing serious consequences. For example, if the time service system of the base station receives the pseudo GNSS signal which cannot provide a timing reference signal, the tracking of the pseudo GNSS signal is unable for giving time normally, which may interfere with the neighboring base station, resulting in the paralysis of a large area wireless network. Therefore, how to prevent the pseudo GNSS signals from interfering the time service system of the communication device is an urgent problem to be solved.

First Embodiment

Figure 1:
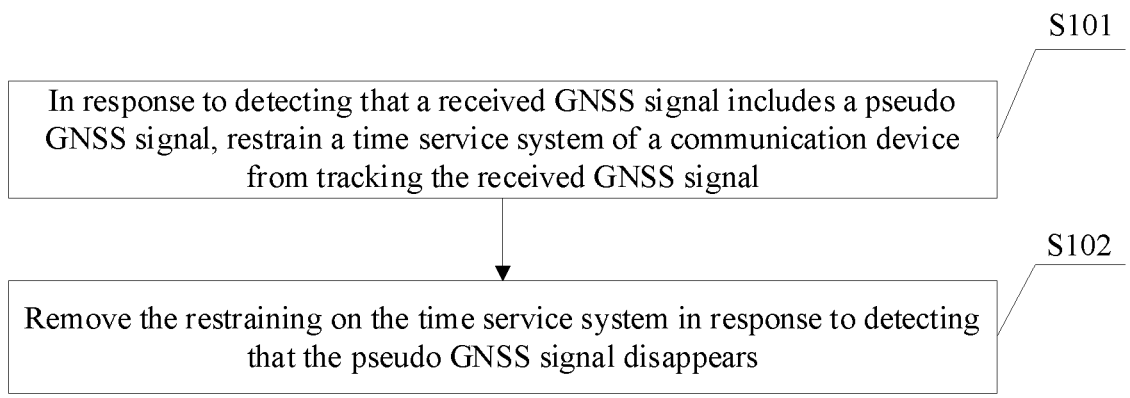
FIG. 1 is a flow chart of a control method for preventing pseudo GNSS signal interference according to a first embodiment of the present disclosure.

The embodiment is provided to avoid various interference problems caused by the time service system of communication device receiving a pseudo GNSS signal which cannot provide a timing reference signal and tracking the pseudo GNSS signal which cannot give time normally. In the embodiment, when it is detected that a GNSS signal received by the time service system of the communication device includes(is) a pseudo GNSS signal, the time service system of the communication device is restrained from tracking the received GNSS signal, so as to avoid the time service system from tracking the pseudo GNSS signal, thereby avoiding the interference caused by the pseudo GNSS signal to the time service system of the communication device, thus further avoiding the influence on other communication devices due to the failure of the time service system to give time normally. For ease of understanding, the present embodiment is described below with reference to the control method for preventing pseudo GNSS signal interference shown in FIG. 1 as an example, including following operations:

In S101, in response to detecting that a received GNSS signal includes a pseudo GNSS signal, restrain a time service system of a communication device from tracking the received GNSS signal.

In the embodiment, whether the GNSS signal received by the time service system of the communication device includes a pseudo GNSS signal may be identified. It should also be understood that in the embodiment, when performing identification of the pseudo GNSS signal, it is possible to identify whether the received GNSS signal includes a pseudo GNSS signal from one or more dimensions based on various characteristics of the pseudo GNSS signal. For ease of understanding, the embodiment will be described below in several exemplary identification manners.

In the embodiment, the currently received GNSS signal includes a pseudo GNSS signal may be determined when it is detected that at least one of the following first conditions is satisfied.

(11) A localization position obtained according to the received GNSS signal does not match a standard position.

In the embodiment, the communication device can obtain the localization position based on the GNSS signals received by the time service system. When the received GNSS signal does not include the pseudo GNSS signal, the obtained localization position is accurate, and at this time, the localization position should match the standard position (that is, a position deviation between the localization position and the standard position is within a preset range). When the received GNSS signal includes the pseudo GNSS signal, the obtained localization position may be inaccurate, and the obtained localization position may not match the standard position at this time (that is, the position deviation between the localization position and the standard position is outside the preset range).

In the embodiment, the communication device can obtain the localization position based on the GNSS signals received by the time service system. When the received GNSS signal does not include the pseudo GNSS signal, the obtained localization position is accurate, and at this time, the localization position should match the standard position (that is, a position deviation between the localization position and the standard position is within a preset range). When the received GNSS signal does not include the pseudo GNSS signal, the obtained localization position may be inaccurate, and the obtained localization position may not match the standard position at this time (that is, the position deviation between the localization position and the standard position is outside the preset range).

Certainly, it should be understood that the communication device in the embodiment executes the above control process on the premise that a satellite reception is normal (that is, the number of locked satellites is greater than a minimum required number of searched satellites, and the position mode of satellites is a position localization state).

(12) A leap second value extracted from the received GNSS signal does not match a standard leap second value.

In the embodiment, the leap second refers to a difference between UTC (Universal Time Coordinated, also known as Universal Unified Time or Universal Standard Time or International Coordinated Time) time and GPS (Global Positioning System) time (i.e., atomic time), and this value may change with time. In the embodiment, the standard leap second value can be synchronized on the normal satellite, so that the standard leap second value can be included in the non-pseudo GNSS signal. However, the leap second value included in the pseudo GNSS signal may be empty or non-standard leap second value. In this way, after receiving the GNSS signal, the time service system of the communication device may extract the leap second value from the GNSS signal, and then compare the extracted leap second value with the standard leap second value. If the two values do not match, it may be determined that the received GNSS signal includes a pseudo GNSS signal. For example, in one example, the standard leap second value may be set to 18 seconds, and the standard leap second value can be dynamically updated over time.

(13) A time value resolved from the received GNSS signal is less than or equal to a standard time value last stored by the communication device.

In the embodiment, the standard time value stored by the communication device is an accurate time value. The standard time value may be an accurate time value set when the communication device at the time of factory shipment. Or, the standard time value may also be an accurate time value obtained by the communication device according to a true GNSS signal when the communication device receives the true GNSS signal. That is, in the embodiment, the communication device may store the most recent accurate time value as the standard time value when the GNSS normally receives signals from satellites after the system is powered on.

In this way, after receiving the GNSS signal, the communications device resolves the time value based on the received GNSS signal, and then compares the resolved time value with the standard time value stored in the system. Theoretically, the resolved time value of the GNSS receiver of the communication device is incremental, so if the time value resolved based on the received GNSS signal is less than or equal to the standard time value stored in the system, the GNSS receiver is considered to have received the pseudo GNSS signal.

(14) A phase difference between a phase resolved from the received GNSS signal and a standard phase is greater than a first phase difference threshold.

In the embodiment, the standard phase value may be a phase value set based on a reference phase local to the communication device system. After receiving the GNSS signal, the phase may be resolved from the GNSS signal, and then the phase difference between the resolved phase and the standard phase can be obtained by aligning and comparing the resolved phase with the standard phase. If the GNSS signal received by the communication device is a non-pseudo GNSS signal (i.e., a true GNSS signal), the phase difference is generally relatively small (e.g., the phase difference may be obtained based on the test, and a first phase difference threshold can be correspondingly set). Therefore, if the phase difference is greater than the first phase difference threshold, it indicates that the received GNSS signal is a pseudo GNSS signal. In some examples of the present embodiment, in order to improve the accuracy degree of the determination result, it is also possible to continuously detect for a period of time (the time period can be flexibly set according to specific requirements), and in this time period, if the obtained phase differences are all greater than the first phase difference threshold, it is determined that pseudo GNSS signals are present in the received GNSS signals.

It should also be understood that any phase acquisition method can be used for acquiring the phase according to the received GNSS signal and will not be described here.

(15) A frequency difference between a frequency resolved from the received GNSS signal and a standard frequency is greater than a first frequency difference threshold.

In the embodiment, since the frequency of the atomic clock adopted by the satellite is stable and reliable, the standard frequency can be set based on the frequency of the atomic clock. After receiving the GNSS signal, the frequency can be estimated based on the received GNSS signal, and then compared with the standard frequency to obtain a frequency difference, i.e., a frequency offset. The frequency difference is generally small when the GNSS signal received by the communication device is the non-pseudo GNSS signal (i.e., the true GNSS signal). If the frequency difference is greater than a first frequency difference threshold, it indicates that the received GNSS signal includes the pseudo GNSS signal. In some examples of the present embodiment, in order to improve the accuracy degree of the determination result, it is also possible to continuously detect for a period of time (the time period can be flexibly set according to specific requirements), and in this period of time, if the obtained frequency differences are all greater than the first frequency difference threshold, it is determined that the received GNSS signals includes the pseudo GNSS signals.

In addition, it should be understood that any phase acquisition method may be used for estimating the frequency according to the received GNSS signal, such as calculating the frequency based on a control word of a crystal oscillator at the time of locking stored locally in the communication device (the control word may be the relevant corrected control word), a slope of the crystal oscillator, etc.

It should be understood that it may flexibly select from the above five first conditions to identify whether or not the pseudo GNSS signal is present in the received GNSS signal. For example, in one example, the above five first conditions can be employed, it is determined that the pseudo GNSS signal is present in the received GNSS signal as long as any one of the five first conditions is satisfied. For another example, one of the five first conditions described above may be employed to determine whether the pseudo GNSS signal is present in the received GNSS signal. For another example, two or three or four of the five first conditions described above may be employed to determine whether the pseudo GNSS signal is present in the received GNSS signal. It should also be understood that the above five first conditions are only a few conditions exemplified based on the characteristics of the pseudo GNSS signal, and the identification of the pseudo GNSS signal is not limited to the cases of the above example.

In the embodiment, the manner for restraining the time service system of the communication device can be flexibly selected, as long as the time service system can be ensured to not track the received pseudo GNSS signal. For ease of understanding, the embodiment will be described below by the way of exemplary restraint methods, which may be in, but is not limited to, any of the following ways.

Method one: switch the system clock of the time service system to a standby clock source when the time service system of the communication device has the standby clock source; in this manner, the system clock of the time service system can be switched back when the restraint is removed.

Method two: control the system clock of the time service system of the communication device to enter a hold state according to a current state (that is, a normal state).

Method three: control the system clock of the time service system of the communication device to enter a free running state.

In S102, remove the restraining on the time service system in response to detecting that the pseudo GNSS signal disappears.

In the present embodiment, the detection of whether the pseudo GNSS signal disappears may also be determined by setting one or more dimensions based on various characteristics of the pseudo GNSS signal. Certainly, the detection is also performed based on the premise that the communication device normally receives signals from satellites. For ease of understanding, the embodiment will be described below by the way of exemplary determination methods.

In present embodiment, it may be determined that the pseudo GNSS signal disappears when at least one of the following second conditions is detected to be satisfied.

(21) A localization position obtained according to the received GNSS signal matches a standard position.

(22) A leap second value extracted from the received GNSS signal matches a standard leap second value.

(23) A time value resolved from the received GNSS signal is greater than a standard time value last stored by the communication device.

The above second conditions are all characteristics of the non-pseudo GNSS signal (i.e., the true GNSS signal), and therefore, when one or more of the above three second conditions are achieved, it indicates that the pseudo GNSS signal may not be present in the currently received GNSS signal, that is, it indicates that the pseudo GNSS signal disappears. It should be understood that the above three second conditions can be flexibly selected according to specific application scenarios. For example, one, two or three of them can be selected to determine whether the pseudo GNSS signal disappears. To improve accuracy degree of determination results, it may be determined that the pseudo GNSS signal disappears when all of the selected second conditions are satisfied. In an example, it may be determined that the pseudo GNSS signal disappears when all of the three second conditions are satisfied.

In some application scenarios of the embodiment, in order to further improve accuracy degree of determination results, after detecting that all or at least one of the above second conditions is satisfied and before determining that the pseudo GNSS signal disappears, the method further includes determining that the pseudo GNSS signal disappears when at least one of the following third conditions is satisfied.

(31) A phase difference between a phase resolved from the received GNSS signal and a standard phase is less than or equal to a second phase difference threshold.

It should be understood that a value of the second phase difference threshold in the embodiment may be the same as or different from the first phase difference threshold, and may be flexibly set according to the requirements.

(32) A frequency difference between a frequency resolved from the received GNSS signal and a standard frequency is less than or equal to a second frequency difference threshold.

It should be understood that a value of the second frequency difference threshold in the embodiment may be the same as or different from the first frequency difference threshold, and may be flexibly set according to requirements.

It should be understood that the above two third conditions may be flexibly selected according to specific application scenarios. For example, one or both of the above two third conditions may be selected to determine whether the pseudo GNSS signal disappears. In order to improve the accuracy degree of determination results, it may be determined that the pseudo GNSS signal disappears when the selected third conditions are satisfied. In an example, it may be determined that the pseudo GNSS signal disappears when the above two third conditions are satisfied.

Some examples are provided in order to avoid the problem that the control word of the crystal oscillator is incorrectly stored because that the time service system of the communications device tracks the pseudo GNSS at the beginning of power-on, resulting in the base station being unable to recover. When it is determined that at least one of the third conditions is not satisfied after detecting that all of the second conditions are satisfied, the method further includes: starting timing when it is detected that all of the second conditions are satisfied, and determining that the pseudo GNSS signal disappears when it is detected that all of the three second conditions are satisfied in a process continues until a timing value reaches a preset time threshold.

In some examples of the embodiment, the purpose of removing the restraint on the time service system is to enable the time service system to normally track the currently received GNSS signal. In this process, the system time, position, and information regarding crystal oscillator (including but not limited to the slope of the crystal oscillator and the control word of the crystal oscillator at the time of locking) may be used to facilitate subsequent identification of the pseudo GNSS signal.

In the control method for preventing pseudo GNSS signal interference provided by the embodiment, the time service system of the communication device may identify the pseudo GNSS signal, to avoid a large area interference caused by the communication system tracking the pseudo GNSS signal; and multidimensional recovery conditions may be set to prevent the system from being unable to recover under pseudo GNSS protection.

Second Embodiment

In order to facilitate understanding, the present embodiment takes an example where a communication device is a base station, to describe a control method for preventing pseudo GNSS signal interference of the base station.

The control method for preventing pseudo GNSS signal interference of the base station in the embodiment mainly includes the following three parts: (1) information collection and storage; (2) identification of the pseudo GNSS signal; and (3) recovery after the pseudo GNSS signal disappears. When leaving the factory, a system time of the base station may be set as a standard time, a position of the base station may be set as a standard position, and the base station acquires and stores a control word of the crystal oscillator and useful information related to the slope of the crystal oscillator. When GNSS normally receives signals from satellites after the base station system is powered on, the system time being collected and updated as the standard time, collection and setting of the position information, and collection and storage of the information regarding the crystal oscillator are performed.

Figure 2:
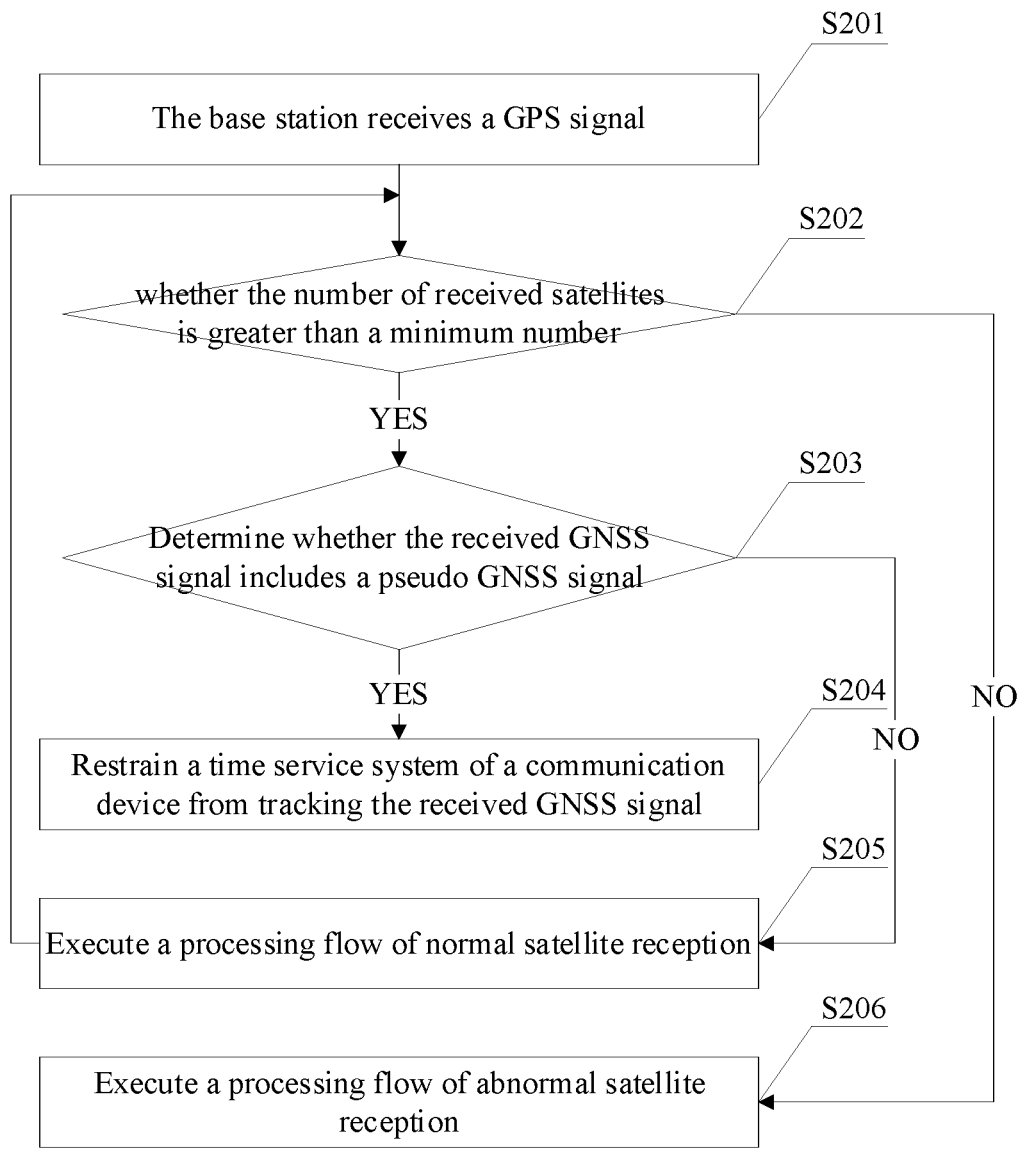
FIG. 2 is a flow chart of a control for preventing pseudo GNSS signal interference according to a second embodiment of the present disclosure.

The control process for preventing pseudo GNSS signal interference after the base station is powered on is shown in FIG. 2, which includes following operations.

In S201, the base station receives a GPS signal.

In S202, determine whether the number of received satellites is greater than a minimum number requirement, if yes, proceed to S203; otherwise, proceed to S206.

In S203, determine whether the received GNSS signal includes a pseudo GNSS signal, if yes, proceed to S204; otherwise, proceed to S205.

In S204, restrain a time service system of a communication device from tracking the received GNSS signal.

In S205, execute a processing flow of normal satellite reception.

In S206, execute a processing flow of abnormal satellite reception.

Figure 3:
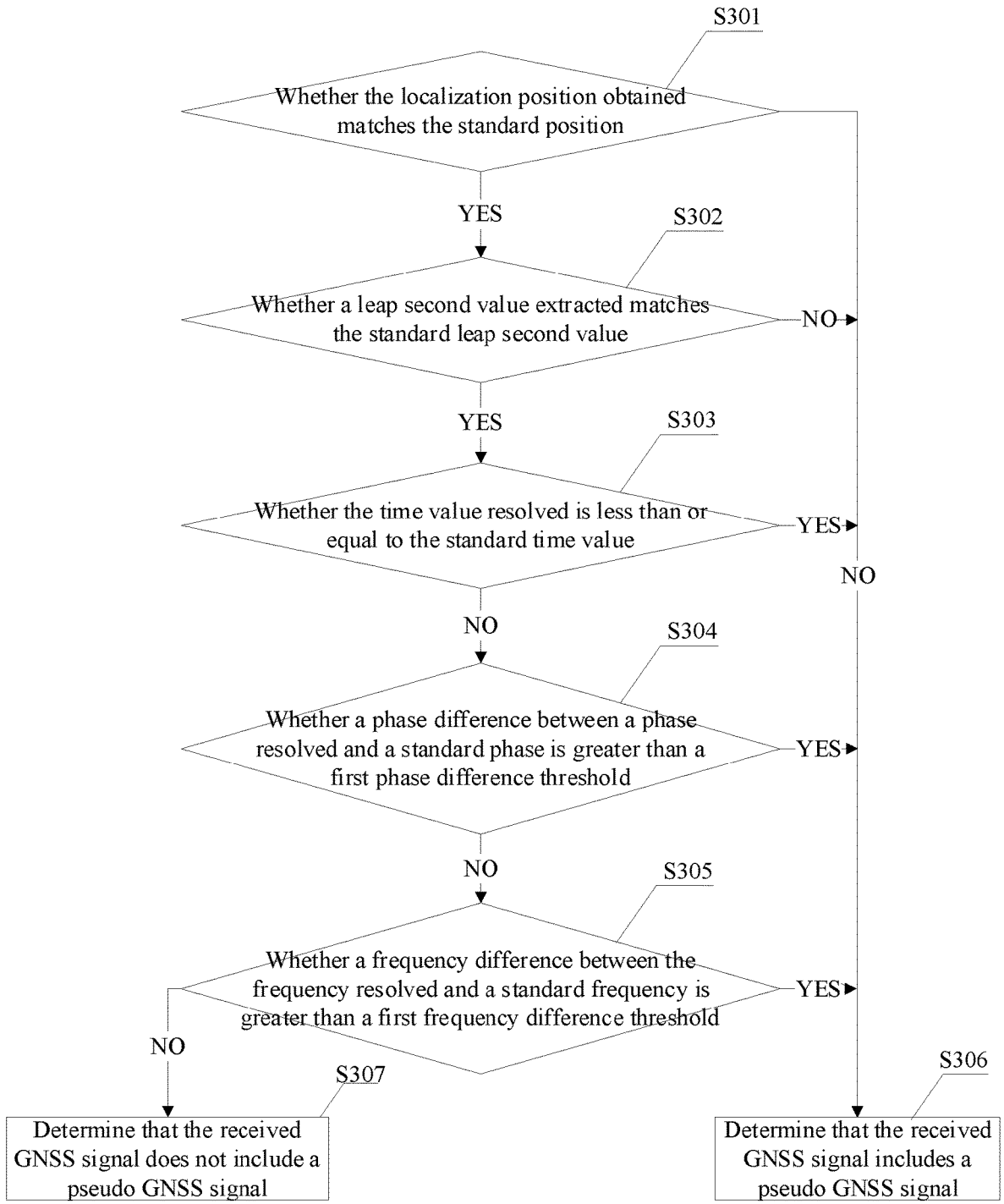
FIG. 3 is a flow chart for determining whether at least one received GNSS signal includes a pseudo GNSS signal according to the second embodiment of the present disclosure.

The process of determining whether the received GNSS signal includes a pseudo GNSS signal in S203 is shown in FIG. 3, which includes following operations.

In S301, determine whether the localization position obtained according to the received GNSS signal matches the standard position, if yes, proceed to S302; otherwise, proceed to S307.

In S302, determine whether a leap second value extracted from the received GNSS signal matches the standard leap second value; if yes, proceed to S303; otherwise, proceed to S307.

In S303, determine whether the time value resolved from the received GNSS signal is less than or equal to the standard time value last stored by the communication device; if yes, proceed to S304; otherwise, proceed to S307.

In S304, determine whether a phase difference between a phase resolved from the received GNSS signal and a standard phase is greater than a first phase difference threshold; if no, proceed to S305; otherwise, proceed to S307.

In S305, determine whether a frequency difference between the frequency resolved from the received GNSS signal and a standard frequency is greater than a first frequency difference threshold; if no, proceed to S306; otherwise, proceed to S307. In addition, it should be understood that an order of execution of S301 to S305 described above in the embodiment may be flexibly combined and not limited to the order shown in FIG. 3.

In S306, determine that the received GNSS signal includes a pseudo GNSS signal.

In S307, determine that the received GNSS signal does not include a pseudo GNSS signal.

Figure 4:
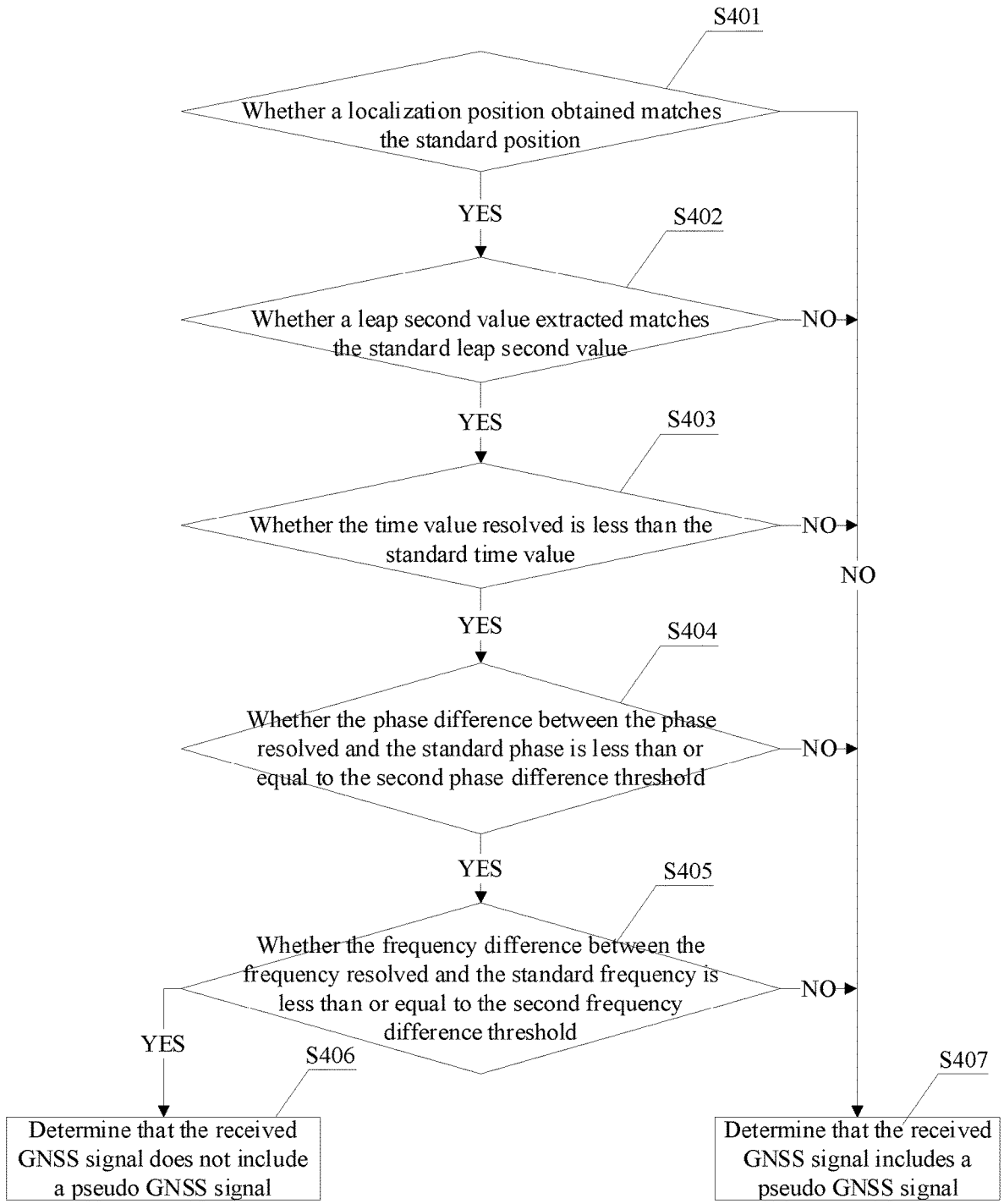
FIG. 4 is a flow chart for determining whether the pseudo GNSS signal disappears according to the second Embodiment of the present disclosure.

After the time service system of the communication device is restrained from tracking the received GNSS signal at S204, that is, during the process for preventing pseudo GNSS signal interference, a process for determining whether the pseudo GNSS signal disappears is further included. In an example, the process is shown in FIG. 4, which includes following operations.

In S401, determine whether a localization position obtained according to the received GNSS signal matches the standard position, if yes, proceed to S402; otherwise, proceed to S407.

In S402, determine whether a leap second value extracted from the received GNSS signal matches the standard leap second value; if yes, proceed to S403; otherwise, proceed to S407.

In S403, determine whether the time value resolved from the received GNSS signal is greater than the standard time value last stored by the communication device; if yes, proceed to S404; otherwise, proceed to S407.

In S404, determine whether the phase difference between the phase resolved from the received GNSS signal and the standard phase is less than or equal to the second phase difference threshold; if yes, proceed to S405; otherwise, proceed to S407.

In S405, determine whether the frequency difference between the frequency resolved from the received GNSS signal and the standard frequency is less than or equal to the second frequency difference threshold; if yes, proceed to S406; otherwise, proceed to S407.

In S406, determine that the received GNSS signal does not include a pseudo GNSS signal, and execute storage of useful information when the satellite reception is normal.

In S407, determine that the received GNSS signal includes a pseudo GNSS signal.

In FIG. 4, when the determination results in S401 to S403 are all YES and the determination result in at least one of S405 and S404 is NO, it is also possible to determine that detect that the received GNSS signal does not include a pseudo GNSS signal based on the determination results in S401 to S403 are all YES in a preset time period. The processing flow for normal satellite reception is executed afterwards.

It can be seen that, the time service system of the communication device in the embodiment may identify the pseudo GNSS signal by storing useful information and setting multi-dimensional conditions, thus avoiding large-area interference caused by tracking the pseudo GNSS signal by the communication system. It is also possible to set multidimensional recovery conditions to prevent the system from being unable to recover under pseudo GNSS protection.

Third Embodiment

Figure 5:
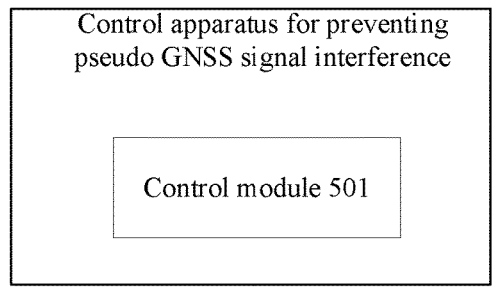
FIG. 5 is a schematic structural diagram of an apparatus for preventing pseudo GNSS signal interference according to a third embodiment of the present disclosure.

The present embodiment provides a control apparatus for preventing pseudo GNSS signal interference, which may be disposed in various communication devices. As shown in FIG. 5, the control apparatus for preventing pseudo GNSS signal interference includes a control module 501. The control module 501 is configured to: (1) restrain the time service system of the communication device from tracking the received GNSS signal in response to detecting that the received GNSS signal includes a pseudo GNSS signal; and (2) remove the restraint on the time service system in response to detecting that the pseudo GNSS signal disappears. It should also be understood that the functions of the control module 501 in the embodiment may be realized by a processor within the communication device.

In the embodiment, the control module 501 may identify whether the GNSS signal received by the time service system of the communication device is a pseudo GNSS signal. It should be understood that in the embodiment, when identifying the pseudo GNSS signal, the control module 501 may identify whether the received GNSS signal is the pseudo GNSS signal from one or more dimensions based on various characteristics of the pseudo GNSS signal. For ease of understanding, the present embodiment will be described below in several exemplary identification methods.

In the embodiment, the control module 501 may determine that the currently received GNSS signal includes the pseudo GNSS signal when it is detected that at least one of the following first conditions is satisfied.

A localization position obtained according to the received GNSS signal does not match a standard position.

A leap second value extracted from the received GNSS signal does not match a standard leap second value.

A time value resolved from the received GNSS signal is less than or equal to a standard time value last stored by the communication device.

A phase difference between a phase resolved from the received GNSS signal and a standard phase is greater than a first phase difference threshold.

A frequency difference between a frequency resolved from the received GNSS signal and a standard frequency is greater than a first frequency difference threshold.

It should be understood that, it is possible to flexibly select which of the above five first conditions is adopted by the control module 501 to identify whether or not the received GNSS signal includes the pseudo GNSS signal.

In the embodiment, it is possible to flexibly select the manner in which the control module 501 restrains the time service system of the communication device, as long as the time service system is ensured to not track the received pseudo GNSS signal. For ease of understanding, the present embodiment will be described below by the way of limitation of several examples, and the control module 501 may use, but is not limited to, any of the following ways.

Switch the system clock of the time service system to the standby clock source when the time service system of the communication device has a standby clock source; in this manner, it is possible to switch back to the system clock of the time service system when the restraint is removed.

Control the system clock of the time service system of the communication device to enter a hold state according to a current state (that is, a normal state).

Control the system clock of the time service system of the communication device to enter a free running state.

In the embodiment, the detection of whether the pseudo GNSS signal disappears by the control module 501 may be determined by setting one or more dimensions based on various characteristics of the pseudo GNSS signal. Certainly, the detection is performed based on the premise that the communication device normally receives signals from satellites. For ease of understanding, the embodiment will be described below by the way of exemplary determination manners. In the embodiment, the control module 501 may determine that the pseudo GNSS signal disappears when it is detected that at least one of the following second conditions is satisfied.

A localization position obtained according to the received GNSS signal matches a standard position.

A leap second value extracted from the received GNSS signal matches a standard leap second value.

A time value resolved from the received GNSS signal is greater than a standard time value last stored by the communication device.

The above second conditions are all characteristics of the non-pseudo GNSS signal (i.e., the true GNSS signal), and therefore, when one or more of the above three second conditions are detected, it indicates that the currently received GNSS signal does not include the pseudo GNSS signal, that is, it indicates that the pseudo GNSS signal disappears. It should be understood that the above three second conditions may be flexibly selected according to specific application scenarios. For example, one, two or three of the above three second conditions may be selected to determine whether the pseudo GNSS signal disappears. To improve an accuracy degree of determination results, it may be determined that the pseudo GNSS signal disappears only when all of the selected second conditions are satisfied. In an example, it may be determined that the pseudo GNSS signal disappears when all of the three second conditions are satisfied.

In some application scenarios of the present embodiment, in order to further improve the accuracy degree of determination results, after detecting that all or at least one of the above second conditions is satisfied and before determining that the pseudo GNSS signal disappears, the control module 501 further determines that the pseudo GNSS signal disappears when at least one of the following third conditions is satisfied.

A phase difference between a phase resolved from the received GNSS signal and a standard phase is less than or equal to a second phase difference threshold.

A frequency difference between a frequency resolved from the received GNSS signal and a standard frequency is less than or equal to a second frequency difference threshold.

It should be understood in the present embodiment that a value of the second frequency difference threshold may be the same as or different from the first frequency difference threshold, and may be flexibly set according to requirements.

It should be understood that the above two third conditions may be flexibly selected according to specific application scenarios.

Some examples are provided in order to avoid the problem that the control word of the crystal is incorrectly stored because that the time service system of the communications device tracks the pseudo GNSS at the beginning of power-on, resulting in the base station being unable to recover. When it is determined that at least one of the third conditions is not satisfied after detecting that all of the second conditions are satisfied, the control module 501 is further configured to: start timing when it is detected that all of the second conditions are satisfied, and determine that the pseudo GNSS signal disappears when it is detected that all of the three second conditions are satisfied in a process continues until a timing value reaches a preset time threshold. In some examples of the present embodiment, the purpose of removing the restraint on the time service system is to enable the time service system to normally track the currently received GNSS signal; in this process, the system time, position and information regarding crystal oscillator (including but not limited to the slope of the crystal oscillator and the control word of the crystal oscillator at the time of locking) can be used to facilitate subsequent identification of the pseudo GNSS signal.

It can be seen that, in the control apparatus for preventing pseudo GNSS signal interference provided by the embodiment, the pseudo GNSS signal may be identified, to avoid a large area interference caused by the communication system tracking the pseudo GNSS signal; and multidimensional recovery conditions may be set to prevent the system from being unable to recover under pseudo GNSS protection.

Fourth Embodiment

Figure 6:
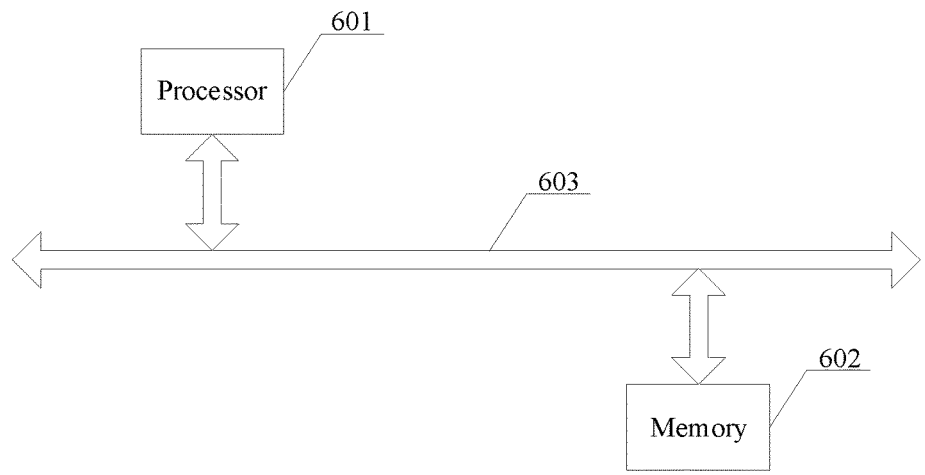
FIG. 6 is a schematic structural diagram of a communication device according to a fourth embodiment of the present disclosure.

The embodiment further provides a communication device, which may be a user-side apparatus, such as various user devices at the user-side (such as, user terminals), or a communication device at the network-side (such as, a base station device). As shown in FIG. 6, the communication device includes a processor 601, a memory 602 and a communication bus 603.

The communication bus 603 is configured to realize a communication connection between the processor 601 and the memory 602.

In one example, the processor 601 is operable to execute one or more computer programs stored in the memory 602 to implement the operations of the control method for preventing pseudo GNSS signal interference as in the above embodiments.

Figure 7:
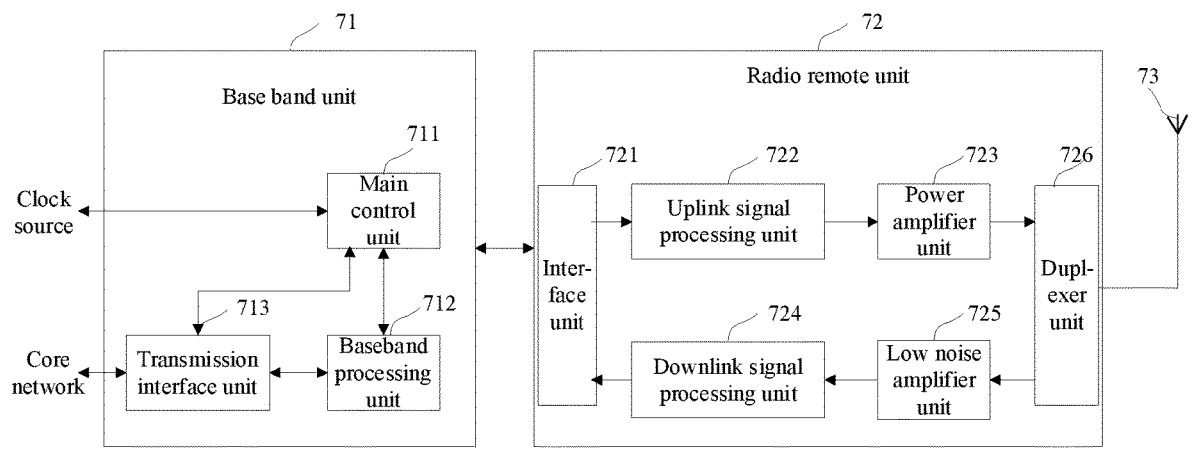
FIG. 7 is a schematic structural diagram of a base station according to the fourth embodiment of the present disclosure.

For ease of understanding, an example of the embodiment is illustrated with the communication device as a base station. It should also be understood that the base station in the embodiment may be a cabinet macro base station, a distributed base station or a multimode base station. As shown in FIG. 7, the base station in this example includes a building base band unit (BBU) 71, a radio remote unit (RRU) 72 and an antenna 73.

The base band unit 71 is responsible for centrally controlling and managing a whole base station system, completing uplink and downlink baseband processing functions, providing physical interfaces with reference radio (RF) units and transmission networks, and completing information interaction. According to different logic functions, as shown in FIG. 7, the base band unit 71 may include a baseband processing unit 712, a main control unit 711, a transmission interface unit 713 and the like. The main control unit 711 mainly realizes functions of control management, signaling processing, data transmission, interaction control, system clock provision of the baseband unit. The baseband processing unit 712 is configured to complete baseband protocol processing such as signal coding modulation, resource scheduling, data encapsulation, etc., and provides an interface between the base band unit and the radio remote unit; and the transmission interface unit 713 is responsible for providing a transmission interface connected with a core network. In this example, the above logical function units may be distributed on different physical boards or integrated on the same board. Alternatively, the base band unit 71 may be of a baseband master integrated type or a baseband master separated type. For the baseband master integrated type, a main control, transmission and baseband are integrated, that is, the baseband processing unit, the main control unit and the transmission interface unit are integrated on a physical board. This architecture has higher reliability, lower latency, higher resource sharing and scheduling efficiency, and lower power consumption. For the baseband master separated type, the baseband processing unit and the main control unit are distributed on different boards, corresponding to a baseband board and a main control board. The separated architecture supports free combination among boards, which is convenient for flexible expansion of baseband. The specific settings may be flexibly adopted according to the needs.

The radio remote unit 72 communicates with the BBU through a baseband radio frequency interface to complete the conversion of the baseband signal and the radio frequency signal. As shown in FIG. 7, in an example, the radio remote unit 72 mainly includes an interface unit 721, a downlink signal processing unit 724, an uplink signal processing unit 722, a power amplifier unit 723, a low noise amplifier unit 725, a duplexer unit 726, and the like, constituting a downlink signal processing link and an uplink signal processing link. The interface unit 721 provides a forward interface with the base band unit, and receives and transmits baseband IQ signals; the downlink signal processing unit 724 completes signal processing functions such as signal up-conversion, digital-to-analog conversion, radio frequency modulation and the like; the uplink signal processing unit 722 mainly completes functions of signal filtering, mixing, analog-to-digital conversion, down-conversion and so on; the power amplifier unit 723 is configured to amplify the downlink signal and send it through the antenna 73, for example to the terminal; the low noise amplifier unit 724 is configured to amplify the downlink signal received by the antenna 73 and send it to the downlink signal processing unit 724 for processing; and the duplexer unit 726 supports multiplexing of transceiving signals and filtering the transceiving signals.

In addition, it should be understood that the base station in the present embodiment may also adopt a CU (Central Unit)-DU (Distributed Unit) architecture, wherein the DU is a distributed access point responsible for completing the bottom baseband protocol and RF processing functions, and the CU is a central unit responsible for processing the high-level protocol functions and centrally managing a plurality of DUs. CU and DU complete the baseband and RF processing functions of the base station together.

In the present embodiment, the base station may also include a storage unit for storing various data. For example, the storage unit may store the one or more computer programs, wherein the main control unit or the central unit may serve as a processor to call the one or more computer programs stored in the storage unit, to implement the operations of the control method for preventing pseudo GNSS signal interference in the above embodiments.

In this example, the control apparatus for preventing pseudo GNSS signal interference is disposed in the base station, and the function of at least one module of the control apparatus for preventing pseudo GNSS signal interference may also be implemented by the main control unit or the central unit.

Figure 8:
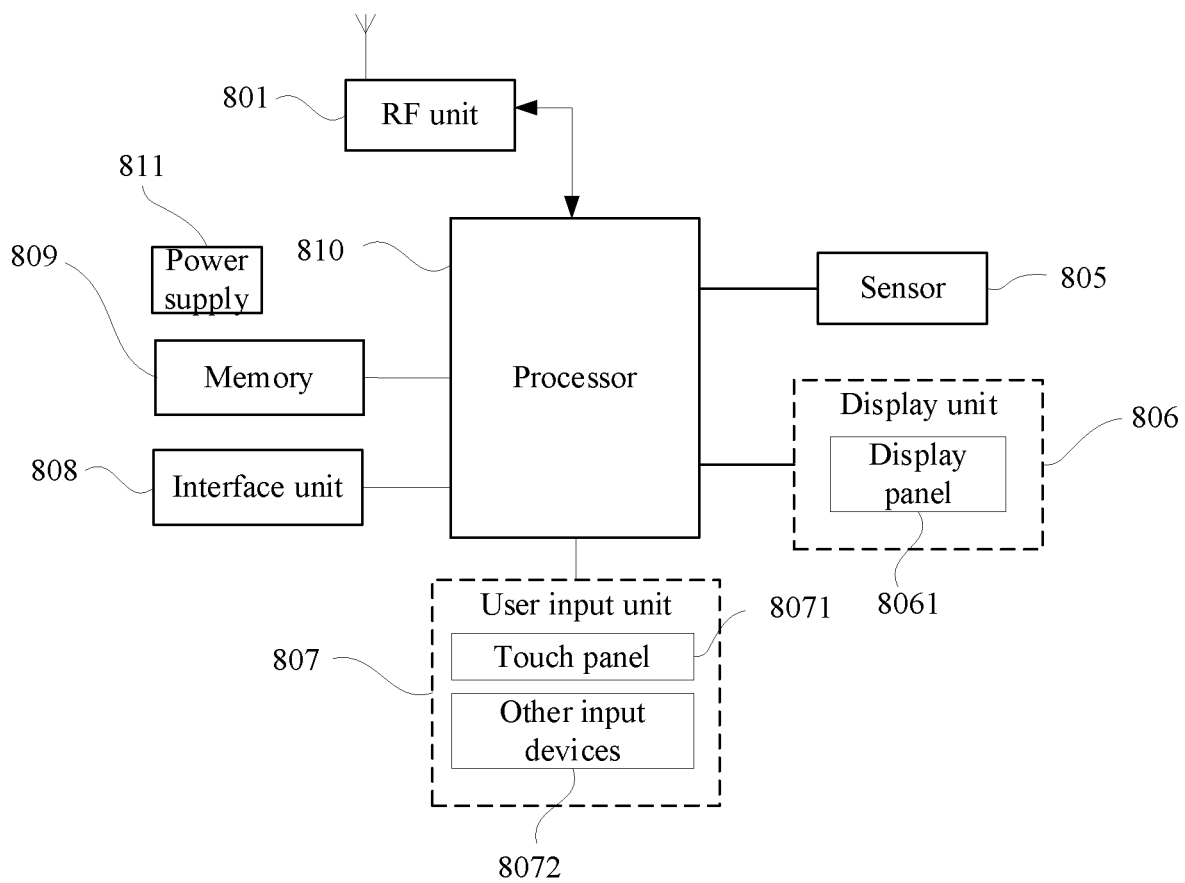
FIG. 8 is a schematic structural diagram of a communication terminal according to the fourth embodiment of the present disclosure.

For ease of understanding, another example of the present embodiment is illustrated with a communication device as a communication terminal. As shown in FIG. 8, the communication terminal may be a mobile terminal having a communication function, such as a mobile phone, a tablet computer, a notebook computer, a palmtop computer, a personal digital assistant (PDA), a navigation apparatus, a wearable device, a smart bracelet, etc. The communication terminal may include components such as a radio frequency (RF) unit 801, a sensor 805, a display unit 806, a user input unit 807, an interface unit 808, a memory 809, a processor 810, and a power supply 811. Those skilled in the art may appreciate that the communication terminal structure shown in FIG. 8 does not constitute a limitation to the communication terminal, and that the communication terminal may include more or fewer components than illustrated, or a combination of certain components, or a different component arrangement.

The RF unit 801 may be used for communication to receive and send signals, such as receiving downlink information from the base station and sending the downlink information to the processor 810 for processing; in addition, the uplink data is transmitted to the base station. Typically, the RF unit 801 includes, but is not limited to, an antenna, at least one amplifier, transceiver, a coupler, a low noise amplifier, a duplexer and the like. In addition, the RF unit 801 may also communicate with a network and other devices through wireless communication. The sensor 805 may be an optical sensor, a motion sensor and other sensors. In an example, the optical sensor includes an ambient optical sensor and a proximity sensor. The ambient optical sensor may adjust brightness of the display panel 8061 according to illuminance of the ambient light.

The display unit 806 is configured to display information input by a user or information provided to a user. The display unit 806 may include a display panel 8061, such as an organic light-emitting diode (OLED) display panel, an active-matrix organic light emitting diode (AMOLED) display panel.

The user input unit 807 may be operable to receive inputted numeric or character information and to generate key signal input related to user settings and function control of the mobile terminal. The user input unit 807 may include a touch panel 8071 and other input devices 8072.

The interface unit 808 serves as an interface through which at least one external apparatus may be connected to the communication terminal. For example, the external apparatus may include an external power supply (or a battery charger) port, a wired or wireless data port, a memory card port, a port for connecting an apparatus having an identification module, an audio input/output (I/O) port, and the like.

The memory 809 may be configured to store software programs as well as various data. The memory 809 may include a high-speed random access memory and may also include a non-transitory memory such as at least one magnetic disk storage device, flash memory device or other transitory solid-state memory devices.

The processor 810 is a control center of the communication terminal, connects various parts of the entire communication terminal by various interfaces and lines, and executes various functions of the communication terminal and processes data by running or executing software programs and/or modules stored in the memory 809 and calling data stored in the memory 809. For example, the processor 810 may be configured to call one or more computer programs stored in the memory 809 to implement the operations of the control method for preventing pseudo GNSS signal interference as described above.

The processor 810 may include one or more processing units; and in an example, the processor 810 may integrate an application processor and a modem processor. The application processor primarily handles operating systems, user interfaces, applications, and the like, and the modem processor primarily handles wireless communications. It will be appreciated that the modem processor described above may also not be integrated into the processor 810.

The power supply 811 (such as a battery), alternatively, may be logically coupled to the processor 810 through a power management system, thereby implementing functions of managing charging, discharging, and power consumption management etc., through the power management system.

In this example, when the control apparatus for preventing pseudo GNSS signal interference is provided in the communication terminal, the function of at least one module of the control apparatus for preventing pseudo GNSS signal interference may also be implemented by the processor 810 described above.

The present embodiment also provides a computer-readable storage medium including transitory or non-transitory, removable or non-removable medium implemented in any method or technique for storing information, such as computer-readable instructions, data structures, computer program modules, or other data. The computer-readable storage medium includes, but is not limited to, RAM (Random Access Memory), ROM (Read-Only Memory), EEPROM (Electrically Erasable Programmable Read Only Memory), flash memory or other memory technology, CD-ROM (Compact Disc Read-Only Memory), digital versatile disk (DVD) or other optical disk storage, magnetic cartridge, magnetic tape, magnetic disk storage or other magnetic storage apparatus, or any other medium that may be used to store desired information and may be accessed by a computer.

In one example, the computer-readable storage medium in the present embodiment may be configured to store one or more computer programs that may be executable by one or more processors to implement the operations of the control method for preventing pseudo GNSS signal interference as in the above embodiments.

The present embodiment also provides a computer program (or referred to as computer software), which may be distributed on a computer readable medium and is executable by a computable apparatus to implement at least one operation of the control method for preventing pseudo GNSS signal interference as shown in the above embodiments; and in some cases, at least one of the operation s shown or described may be executed in a different order than that described in the above embodiments.

The present embodiment also provides a computer program product including a computer readable apparatus on which the computer program as shown above is stored. The computer-readable apparatus in the present embodiment may include a computer-readable storage medium as shown above.

It will be apparent to those skilled in the art that all or some of the operations in the method, the system, and functional modules/units in the apparatus as disclosed above may be implemented as software (which may be implemented with computer program code executable by the computing apparatus), firmware, hardware, and appropriate combinations thereof. In hardware embodiments, the division among functional modules/units mentioned in the above description does not necessarily correspond to the division of physical components; for example, one physical component may have multiple functions, or one function or step may be performed cooperatively by several physical components. Some or all of the physical components may be implemented as software executed by a processor, such as a central processing unit, a digital signal processor, or a microprocessor, or as hardware, or as an integrated circuit, such as an application specific integrated circuit.

In addition, it is well known to those of ordinary skill in the art that communication media typically contain computer readable instructions, data structures, computer program modules, or other data in modulated data signals such as carrier waves or other transmission mechanisms, and may include any information delivery medium. Therefore, the present disclosure is not limited to any particular combination of hardware and software.

The above disclosure is a further detailed description of the embodiments of the present disclosure in connection with the detailed description, and it shall not be considered that the detailed description of the present disclosure is limited to these descriptions only. For those having ordinary skill in the technical field to which the present disclosure pertains, several simple deductions or substitutions can be made without departing from the concept of the present disclosure, all of which should be considered to belong to the protection scope of the present disclosure.

What is claimed is:

1. A control method for preventing pseudo Global Navigation Satellite System (GNSS) signal interference, comprising:
   in response to detecting that a received GNSS signal includes a pseudo GNSS signal, restraining a time service system of a communication device from tracking the received GNSS signal; and
   removing restraining on the time service system in response to detecting that the pseudo GNSS signal disappears;
   wherein that the received GNSS signal includes the pseudo GNSS signal is determined after at least one of the following first conditions is detected to be satisfied:
   a leap second value extracted from the received GNSS signal does not match a standard leap second value; and
   a time value resolved from the received GNSS signal is less than or equal to a standard time value last stored by the communication device.

2. The control method for preventing pseudo GNSS signal interference according to claim 1, wherein the restraining the time service system of the communications device from tracking the received GNSS signal comprises:
   switching, if the time service system of the communication device has a standby clock source, a system clock of the time service system to the standby clock source.

3. The control method for preventing pseudo GNSS signal interference according to claim 1, wherein that the received GNSS signal includes the pseudo GNSS signal is determined after at least one of the following additional first conditions is detected to be satisfied:
   a localization position obtained according to the received GNSS signal does not match a standard position;
   a phase difference between a phase resolved from the received GNSS signal and a standard phase is greater than a first phase difference threshold; and
   a frequency difference between a frequency resolved from the received GNSS signal and a standard frequency is greater than a first frequency difference threshold.

4. The control method for preventing pseudo GNSS signal interference according to claim 1, wherein the pseudo GNSS signal disappears is determined after at least one of the following second conditions is detected to be satisfied:
   a localization position obtained according to the received GNSS signal matches a standard position;
   the leap second value extracted from the received GNSS signal matches the standard leap second value; and
   the time value resolved from the received GNSS signal is greater than the standard time value last stored by the communication device.

5. The control method for preventing pseudo GNSS signal interference according to claim 4, wherein the pseudo GNSS signal disappears is determined after all of the second conditions are detected to be satisfied.

6. The control method for preventing pseudo GNSS signal interference according to claim 1, wherein the restraining the time service system of the communications device from tracking the received GNSS signal comprises:
   controlling the system clock of the time service system to enter a hold state according to a current state.

7. The control method for preventing pseudo GNSS signal interference according to claim 1, wherein the restraining the time service system of the communications device from tracking the received GNSS signal comprises:
   controlling the system clock of the time service system to enter a free running state.

8. The control method for preventing pseudo GNSS signal interference according to claim 5, wherein after detecting that all of the second conditions are satisfied and before determining that the pseudo GNSS signal disappears, the method further comprises:
   determining that the pseudo GNSS signal disappears after at least one of the following third conditions is determined to be satisfied:
   a phase difference between a phase resolved from the received GNSS signal and a standard phase is less than or equal to a second phase difference threshold; and
   a frequency difference between a frequency resolved from the received GNSS signal and a standard frequency is less than or equal to a second frequency difference threshold.

9. The control method for preventing pseudo GNSS signal interference according to claim 8, wherein the pseudo GNSS signal disappears is determined after detecting that all of the second conditions are satisfied, and after determining that all of the third conditions are satisfied.

10. The control method for preventing pseudo GNSS signal interference according to claim 9, wherein after detecting that all of the second conditions are satisfied, and after determining that at least one of the third conditions is not satisfied, the method further comprises:
   starting timing after detecting that all of the second conditions are satisfied, and determining that the pseudo GNSS signal disappears after detecting that all of the second conditions are satisfied in a process continues until a timing value reaches a preset time threshold.

11. A communication device comprising a processor, a memory, and a communication bus, wherein:
   the communication bus is configured to connect the processor and the memory; and
   the processor is configured to execute a computer program stored in the memory to a control method for preventing pseudo GNSS signal interference;
   wherein the control method comprises:
      in response to detecting that a received GNSS signal includes a pseudo GNSS signal, restraining a time service system of a communication device from tracking the received GNSS signal; and
      removing restraining on the time service system in response to detecting that the pseudo GNSS signal disappears;
      wherein that the received GNSS signal includes the pseudo GNSS signal is determined after at least one of the following first conditions is detected to be satisfied:
         a leap second value extracted from the received GNSS signal does not match a standard leap second value; and
         a time value resolved from the received GNSS signal is less than or equal to a standard time value last stored by the communication device.

12. The communication device according to claim 6, wherein the restraining the time service system of the communications device from tracking the received GNSS signal comprises:
   switching, if the time service system of the communication device has a standby clock source, a system clock of the time service system to the standby clock source.

13. The communication device according to claim 11, wherein the restraining the time service system of the communications device from tracking the received GNSS signal comprises:
   controlling the system clock of the time service system to enter a hold state according to a current state.

14. The communication device according to claim 13, wherein the pseudo GNSS signal disappears is determined after all of the second conditions are detected to be satisfied.

15. The communication device according to claim 11, wherein the restraining the time service system of the communications device from tracking the received GNSS signal comprises:
   controlling the system clock of the time service system to enter a free running state.

16. The communication device according to claim 15, wherein after detecting that all of the second conditions are satisfied and before determining that the pseudo GNSS signal disappears, the method further comprises:
   determining that the pseudo GNSS signal disappears after at least one of the following third conditions is determined to be satisfied:
      a phase difference between a phase resolved from the received GNSS signal and a standard phase is less than or equal to a second phase difference threshold; and
      a frequency difference between a frequency resolved from the received GNSS signal and a standard frequency is less than or equal to a second frequency difference threshold.

17. The communication device according to claim 11, wherein that the received GNSS signal includes the pseudo GNSS signal is determined after at least one of the following additional first conditions is detected to be satisfied:
   a localization position obtained according to the received GNSS signal does not match a standard position;
   a phase difference between a phase resolved from the received GNSS signal and a standard phase is greater than a first phase difference threshold; and
   a frequency difference between a frequency resolved from the received GNSS signal and a standard frequency is greater than a first frequency difference threshold.

18. The communication device according to claim 17, wherein after detecting that all of the second conditions are satisfied, and after determining that at least one of the third conditions is not satisfied, the method further comprises:
   starting timing after detecting that all of the second conditions are satisfied, and
   determining that the pseudo GNSS signal disappears after detecting that all of the second conditions are satisfied in a process continues until a timing value reaches a preset time threshold.

19. The communication device according to claim 11, wherein the pseudo GNSS signal disappears is determined after at least one of the following second conditions is detected to be satisfied:
   a localization position obtained according to the received GNSS signal matches a standard position;
   the leap second value extracted from the received GNSS signal matches the standard leap second value; and
   the time value resolved from the received GNSS signal is greater than the standard time value last stored by the communication device.

20. A non-transitory computer-readable storage medium, wherein the non-transitory computer-readable storage medium stores at least one computer program executable by at least one processor to implement a control method for preventing pseudo GNSS signal interference, wherein the control method comprises:
- in response to detecting that a received GNSS signal includes a pseudo GNSS signal, restraining a time service system of a communication device from tracking the received GNSS signal; and
- removing restraining on the time service system in response to detecting that the pseudo GNSS signal disappears;
- wherein that the received GNSS signal includes the pseudo GNSS signal is determined after at least one of the following first conditions is detected to be satisfied:
  - a leap second value extracted from the received GNSS signal does not match a standard leap second value; and
  - a time value resolved from the received GNSS signal is less than or equal to a standard time value last stored by the communication device.

\* \* \* \* \*

UNITED STATES PATENT AND TRADEMARK OFFICE
CERTIFICATE OF CORRECTION

| | | |
|---|---|---|
| PATENT NO. | : 12,038,512 B2 | Page 1 of 1 |
| APPLICATION NO. | : 17/617927 | |
| DATED | : July 16, 2024 | |
| INVENTOR(S) | : Li Luo, Xiaoming Fu and Quanshi Zhang | |

It is certified that error appears in the above-identified patent and that said Letters Patent is hereby corrected as shown below:

In the Claims

Column 17 (Claim 12), Line 64, "The communication device according to claim 6" should be "The communication device according to claim 11".

Signed and Sealed this
Twenty-ninth Day of October, 2024

Katherine Kelly Vidal
*Director of the United States Patent and Trademark Office*